United States Patent [19]
DiGiulio et al.

[11] Patent Number: 6,037,973
[45] Date of Patent: Mar. 14, 2000

[54] FILM TRANSPORT AND METHOD

[75] Inventors: Edmund M. DiGiulio, Malibu; James M. Bartell, Long Beach; John Jurgens, Woodland Hills, all of Calif.

[73] Assignee: Cinema Products Corporation, Los Angeles, Calif.

[21] Appl. No.: 08/829,359

[22] Filed: Apr. 2, 1997

[51] Int. Cl.[7] .............................. H04N 5/253; H04N 9/47; H04N 3/36; H04N 9/11
[52] U.S. Cl. ................................................. 348/96; 348/97
[58] Field of Search ................................ 348/96, 97, 102, 348/105, 107, 110, 112; 352/229, 121, 122, 224, 228, 241; H04N 5/253, 9/47, 3/36, 9/11

[56]    References Cited

U.S. PATENT DOCUMENTS

| | | |
|---|---|---|
| 3,298,276 | 1/1967 | Bender . |
| 3,769,457 | 10/1973 | Valenta, Jr. et al. ..................... 178/7.2 |
| 3,942,883 | 3/1976 | Osborn et al. . |
| 4,139,294 | 2/1979 | Aneshansley et al. . |
| 4,206,981 | 6/1980 | Ozaki et al. ............................... 352/14 |
| 4,319,280 | 3/1982 | Roos et al. ............................... 358/214 |
| 4,438,360 | 3/1984 | Held .......................................... 310/83 |
| 4,467,983 | 8/1984 | Ledun .................................. 242/332.4 |
| 4,522,476 | 6/1985 | Renold .................................... 352/225 |
| 4,630,120 | 12/1986 | Childs ..................................... 348/106 |
| 5,266,979 | 11/1993 | Brown et al. ........................... 352/224 |
| 5,333,020 | 7/1994 | Tsukada et al. ........................ 352/166 |
| 5,406,325 | 4/1995 | Parulski et al. . |
| 5,428,387 | 6/1995 | Galt et al. ................................. 348/97 |
| 5,430,477 | 7/1995 | Bachmann et al. ...................... 348/97 |
| 5,834,864 | 11/1998 | Hesterman et al. ..................... 310/40 |

*Primary Examiner*—Vu Le
*Assistant Examiner*—Nhon T. Diep
*Attorney, Agent, or Firm*—Darby & Darby P.C.

[57]    ABSTRACT

A film transport and method for use with an image transfer system to sequentially register respective frames of motion picture film within the field of view of an image recorder. The transport includes a gate having a drive mechanism and a registration mechanism that immobilizes each frame and orients it into a precise stationary position for digital or analog image recording.

21 Claims, 4 Drawing Sheets

FILM TRANSPORT AND METHOD

FIELD OF THE INVENTION

The invention relates to motion picture image transfer systems, and more particularly, a film transport and method for use with an image transfer system and incorporating a pin registration mechanism to precisely register respective film frames within a predetermined recording field for image transfer to a secondary recording medium.

BACKGROUND OF THE INVENTION

Cinematography provides a means of entertainment, education, and cultural preservation. Perceived primarily as a recreational pastime to some, movies often play an important role in the cultural and economic fabric of our society. Today, the motion picture industry comprises a multi-billion dollar market that affects all of us.

A successful cinema production typically depends on many factors besides the receipts from a theatrical release. One critical element is the widespread distribution of the production while public interest remains relatively high. This typically involves releasing the motion picture in a variety of viewable formats for the home viewing market. Popular formats often include magnetic videotape and optical videodiscs. Moreover, taped reproductions usually take place for televised home viewing through subscriber services and the like.

While the public interest in recently released films is of critical importance in the motion picture industry, a heightened awareness has emerged for preserving historical images from the past. Cinema archives include thousands of decades-old original prints. Many of these films remain unseen by current generations. More importantly, however, because the materials used in early motion picture cinematography have a relatively short life span, it is believed that many of the original prints of such films will be lost forever unless the images are transferred to secondary media. Endeavoring to satisfy the public's craving for "home theater," those skilled in the art have devised image transfer systems for recording images from motion picture film to secondary analog and digital data formats. Commonly referred to as "telecine" and "scanner" machines, these systems provide a relatively high quality reproduction of the film consistent with conventional format standards.

Conventional telecine machines typically operate at real-time speed to generate a videotaped reproduction of a motion picture originally recorded on film. The machine generally includes a film transport mechanism comprising respective supply and take-up reels, a gate mechanism, and a video camera. The reels cooperate to drive the film at a constant real-time rate continuously across a substantially transparent film support. The support typically mounts within the gate mechanism and includes a flat transfer stage disposed perpendicular to the image axis of the video camera aperture and positioned opposite a lamphouse. To ensure at least a relatively consistent, albeit approximate lateral registration of the film with the camera aperture, the support often generally includes an edge guiding means. As the film winds through the gate, and across the transfer stage, the video camera continuously records the resulting projected image.

While conventional telecine machines work well for their intended applications, modern special effects requiring a combination of two or more separate scenes into a single scene typically need more accurate registration of the film relative to the camera recording field. Such registration preserves the illusion created by combining the two scenes. Successfully accomplishing these steps in conventional telecine machines often requires substantial time and effort to manually position, align and verify the film registration. Such effort correspondingly affects the videotape distribution schedule.

For creating digital recordings of motion picture film, scanning machines are typically utilized. Conventional scanning systems incorporate many of the same components as telecine machines, but replace the videotape recorder with a digital scanner to record each individual frame. Scanning machines often include a sprocket or capstan-like device disposed in the gate to sequentially engage the film perforations and slowly draw the film through the image stage for scanning. Respective frames are registered in position by a relatively large mechanical pin registration mechanism that is mechanically connected to the sprocket. The pins are aligned such that, during operation, the registration mechanism drives the pins into immovable engagement with perforations disposed a distance away from the frame to be registered. Often, the distance comprises several frames, introducing potential registration inaccuracies based on multiplied tolerance imperfections alone.

Because of the large amount of memory required to digitize each frame of the film in the conventional digital format, two or more videodiscs are often needed to record a single motion picture. To minimize this problem, an alternative format for transferring motion picture film into digital format focuses on image changes to identify recordable subject matter. Rather than recording image data from each respective frame, only sensed changes from previously recorded images are processed through implementation of a compression algorithm. This algorithm, known in the industry as Motion Picture Experts Group-2, or "MPEG-2", reduces the memory required to digitally process the film and enables end recording of an entire motion picture on a single digital videodisc. While conventional scanner machines perform adequately for their intended purposes, the lack of a driver to effect multiple modes of operation substantially hinders the efficiency of the associated film transport mechanism. Moreover, because the driver used in the scanner pin registration mechanism is mechanically coupled to the sprocket or capstan, significant response delays often occur during intermittent operation.

Therefore, those skilled in the art have recognized the need for a film transport and method for use with telecine and scanner systems to sequentially register motion picture film frames sequentially in precise relative position with respect to the recording field and effect optimal image transfer in accordance with one or more selectable modes of operation. The film transport and method of the present invention satisfies these needs.

SUMMARY OF THE INVENTION

The film transport and method of the present invention offers the capability of precisely registering individual motion picture film frames at selectable speeds with respect to an image recorder's field of view. Because the transport includes a pin registration mechanism, suitable uses include both telecine and scanner machines. These advantages enable practical and timely widespread distribution of film reproductions in high quality analog or digital formats.

To realize the advantages outlined above, the film transport of the present invention is configured for use with an image transfer system to sequentially position respective frames of motion picture film into a predetermined registered frame position relative to a field of view of an image recorder. The film is generally formed proximate its respective longitudinal edges with spaced apart perforations aligned in a predetermined relationship with the frames. To take advantage of this relationship, the film transport includes a film supply mechanism for supplying film containing a series of image frames to be transferred, and a film take-up mechanism. A film guideway defines a predetermined film path from the supply mechanism to the take-up mechanism. The transport further includes a controller capable of detecting the relative position of the frames and a gate disposed along the path. The gate includes a drive mechanism having a motor controllable to provide selectable modes of operation for drawing the film frames sequentially along the path according to the selected mode and a registration mechanism actuated by a driver. The driver is coupled to an aligner to drive the aligner to immobilize the film and sequentially orient the perforations to predetermined locations corresponding to the predetermined registered frame position.

The method of the present invention includes steps for sequentially aligning respective frames of a motion picture film into a predetermined registered position with respect to an image recorder field of view and within the gate of a film transport. The film is generally formed proximate its respective longitudinal edges with spaced apart perforations. To effect registration, the method includes the steps of first drawing the frames sequentially into the gate by a drive mechanism having a motor and into an initial position substantially within the field of view. Then, the step of sensing the initial frame position takes place. The method then proceeds with the step of actuating a registration mechanism including a driver independent of the motor to immobilize and orient the frame into the predetermined registered position.

Other features and advantages of the present invention will be apparent from the following detailed description when read in conjunction with the accompanying drawings.

DETAILED DESCRIPTION OF THE PREFERRED EMBODIMENTS

Motion picture film generally comprises a thin elongated strip of photosensitive material that adequately records an image transparency and a corresponding audio track. Formed adjacent the peripheral longitudinal edges of the film are respective perforations for guiding the film through, for example, a movie projector. To ensure that the projected image remains somewhat stationary within a fixed field during projection onto a large viewing screen, the frames are aligned in a relatively precise relationship with the film perforations as the frames are exposed during filming. The relationship between the frame boundaries and the associated perforations is often much more closely controlled than, for example, the dimensional relationship between the frame boundaries and the film edges.

Figure 1:
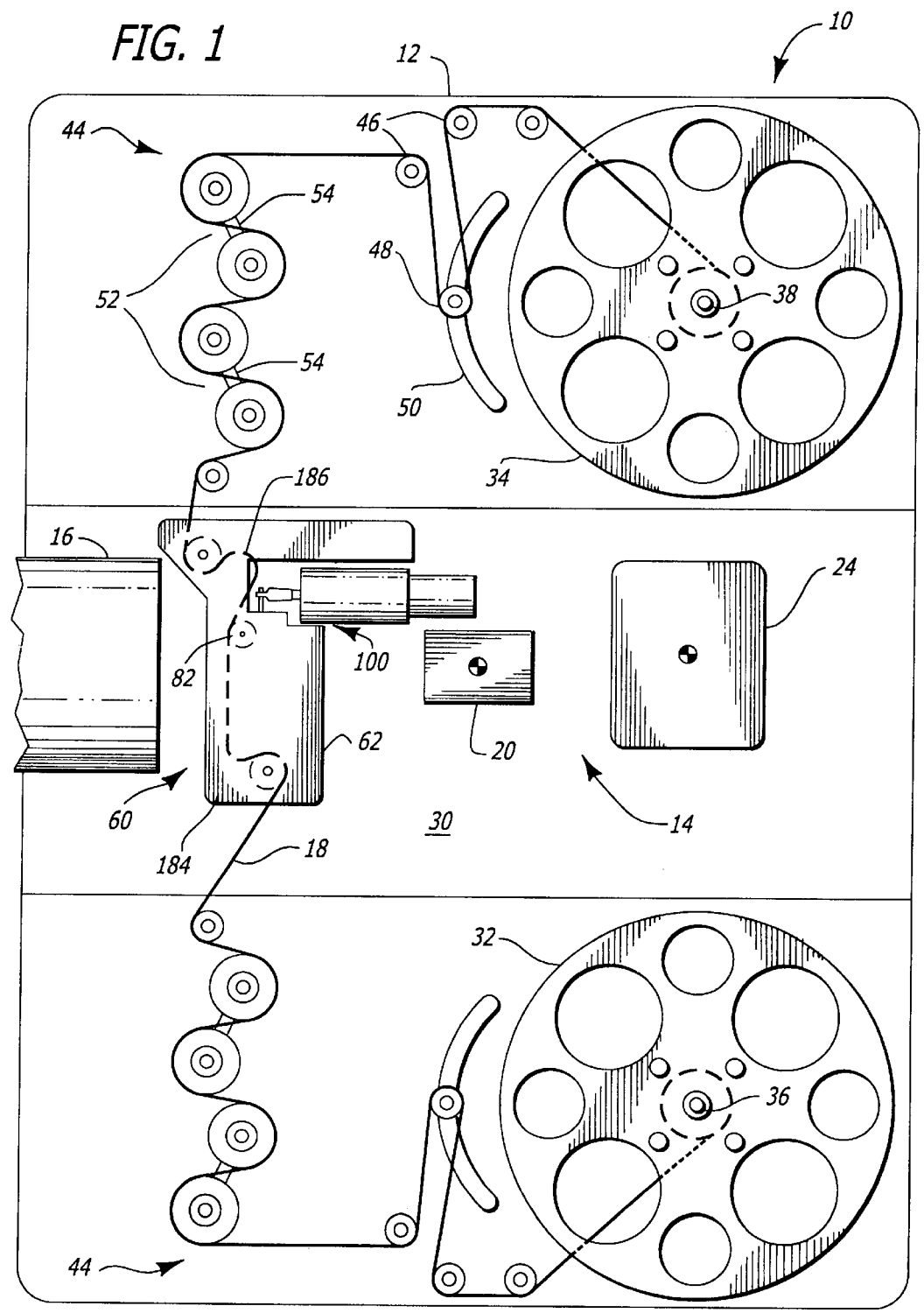
FIG. 1 is a frontal view of an embodiment of a film transport system according to the system of the present invention.

Referring now to FIG. 1, the film transport of the present invention, generally designated 30, is for use with an image transfer system 10 and incorporates a gate 60 having a registration mechanism 100 that takes advantage of the precise relationship between a motion picture film frame image and the frame's respective perforations to sequentially position respective frames precisely within the field of view of an image recorder.

Further referring to FIG. 1, the image transfer system according to the present invention, generally designated 10, includes a console, or cabinet 12 to mount an image recorder 14 and the film transport 30. The recorder generally includes a lamphouse 16 for illuminating respective images projected from respective frames of an elongated strip of film 18. A copy lens 20 is positioned in confronting focal relation to the lamphouse and trained along a precise field of view with respect to the lamphouse to receive a projected image and focus it onto the recording surface of a digital or analog camera 24. According to the principles of the invention, the camera may comprise either a digital scanner to read the images and transform them into a digital format, a digital videotape recorder, or an analog videotape recorder.

Figure 6:
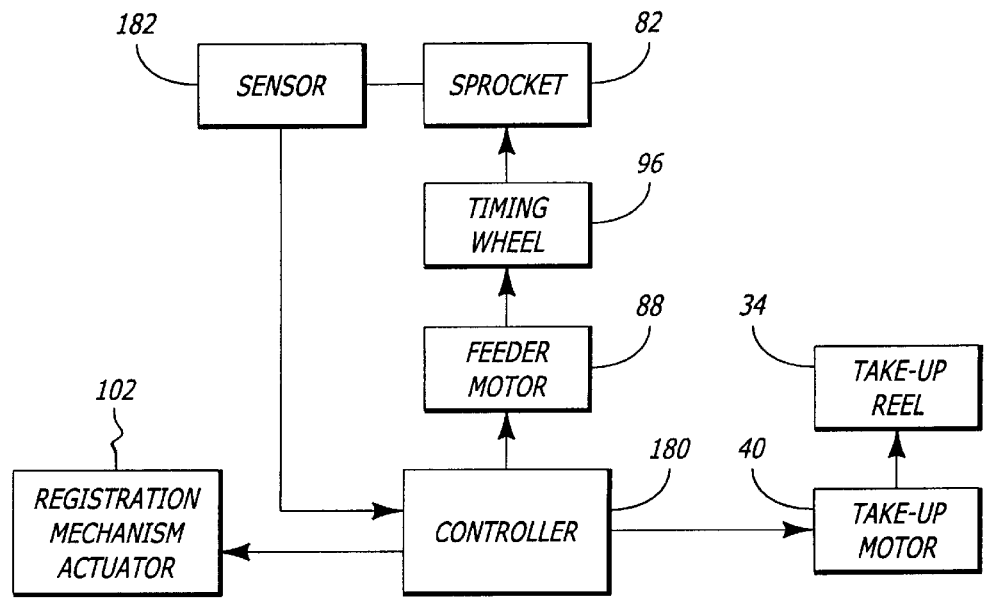
FIG. 6 is a functional block diagram of the electronics and electromechanical components according to the film transport of the present invention.

With further reference to FIG. 1, the film transport of the present invention 30 generally includes respective supply and take-up reels 32 and 34, a film guideway 44, the gate 60 incorporating the registration mechanism 100, and a controller 180 (FIG. 6).

The supply and take-up reels or spools, 32 and 34, provide a convenient means to physically store the film 18 during image transfer. Typically, the film to be reproduced is already wound around its own supply reel, and thus merely requires a supply reel spindle 36 for spool mounting. The take-up reel typically matches the supply spool and mounts to a spindle 38 driven by a motor 40 (FIG. 6) to turn the take-up reel and place the threaded film in motion. The reel motor includes an input responsive to signals from the controller 180 (FIG. 6).

To provide a predictable path for the threaded film 18 to travel between the supply spool 32 and the take-up reel 34, the guideway 44 comprises a plurality of tension rollers 46 and particle transfer rollers (PTR) 52. The tension rollers typically include at least one control roller 48 disposed slidably within a curved slot 50 for adjustment of the tension acting on the film. The PTR rollers 52 function to remove dust or other forms of debris from the film before entrance through the gate. The PTR rollers comprise respective spaced apart pairs of wheels pivotally mounted to respective links 54. The bars 54 are pivotally mounted to the console 12, when aligned in parallel relation, to swivel the respective pairs of wheels to an "open" position and allow relatively easy threading of the film during loading.

Figure 2:
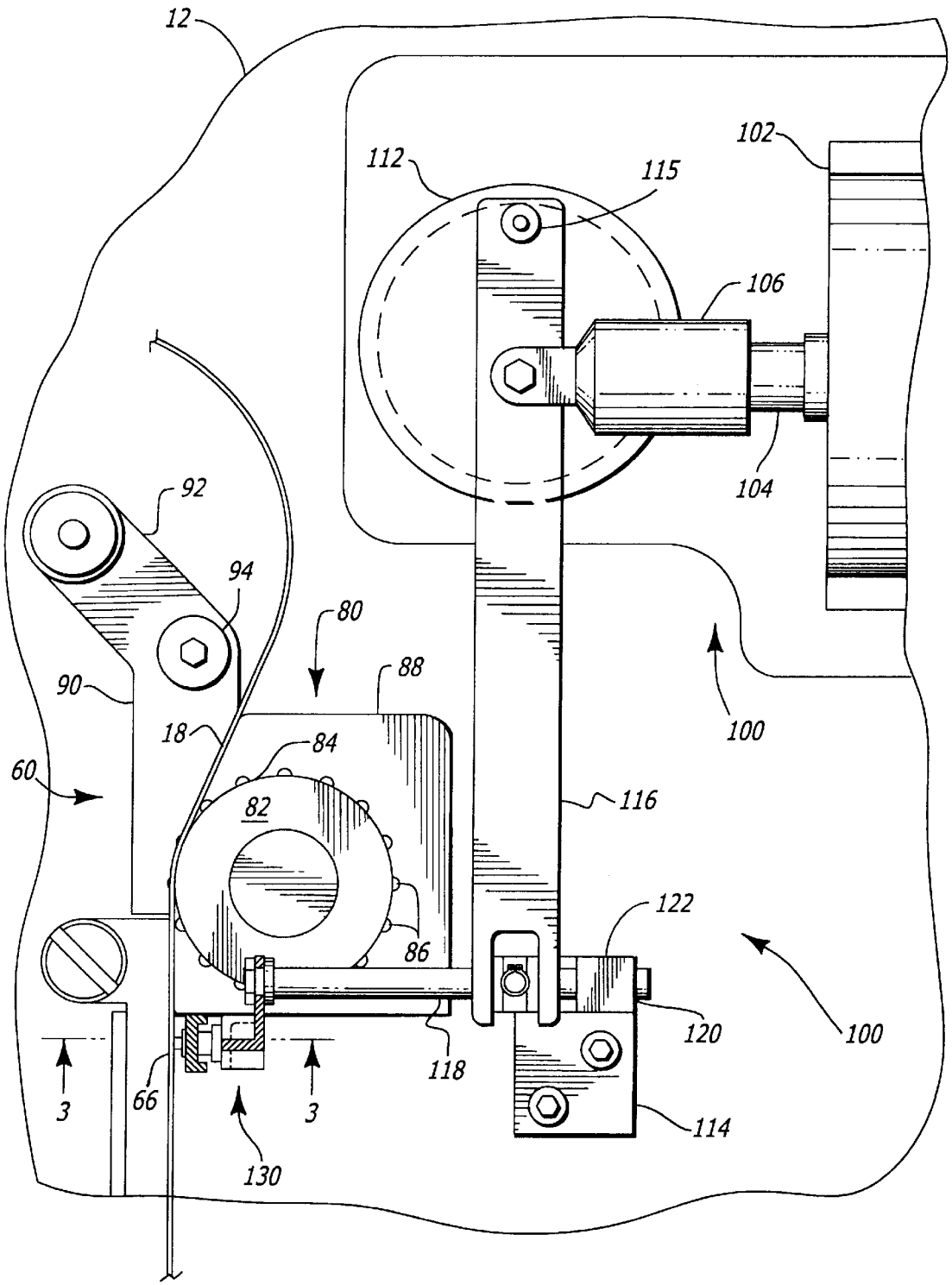
FIG. 2 is an enlarged fragmentary frontal view of the gate shown in FIG. 1 with the housing removed.

Referring to FIGS. 1 and 2, the gate 60 is positioned between the lamphouse 16 and the copy lens 20 to orient or register the respective frames sequentially with respect to the same precise position for proper image transfer to the camera 24. A formed housing 62 mounts to the console 12 and cooperates therewith to provide a protective enclosure for the gate components.

A flat stage 64 (FIG. 3) mounts within the housing 62 and lies substantially perpendicular to the copy lens axis. The stage includes a flat support surface with a formed aperture defining a predetermined registration position or optical path 66 corresponding to the camera field of view to register respective film frames thereagainst. The aperture is typically rectangularly shaped and bounded laterally by respective spaced apart bearing bores 68 and 70 for receiving respective bearings 72 and 74. The bearings are positioned to slidably receive respective guide elements 154 and 156 from the registration mechanism 100. Because the image plane is precisely aligned with the camera field of view, precision alignment of frames with respect to the image plane functions to register the frames with the field of view also.

With particular reference to FIG. 2, a film drive mechanism 80 is positioned at the entrance to the gate 60 and includes a sprocket 82 rotatably coupled to a driver or motor 88. The sprocket 82 includes an outer periphery 84 having a plurality of radially spaced apart and outwardly projecting teeth 86 for engaging the film perforations. The sprocket mounts axially to an output shaft (not shown) driven by the motor 88. A keeper 90 pivotally attaches to the console 12 and includes a thin angled arm 92 and a fastener 94 to hold the film against the sprocket.

Those skilled in the art will recognize that the positioning of the sprocket 82 by the keeper 90 is important to permit the sprocket teeth 86 ample opportunity to engage the film 18 with the sprocket rotating. This generally requires a somewhat tangential alignment of the sprocket radial surface with the surface defined by the threaded film entering the gate. Additionally, while a sprocket has been described in accordance with one embodiment of the present invention, to draw the film through the gate, a capstan may instead be implemented.

The motor 88 used to drive the sprocket 82, according to an embodiment of the present invention, is of the cup armature type and provides a relatively low inertial mass and high torque. The motor responds to signals from the controller 180 and cooperates with a timing wheel 96 (not shown in FIG. 2 but illustrated schematically in FIG. 6) to intermittently turn and stop the sprocket 82 at rates approximately within the range of 1–60 frames per second. The intermittent action of the drive mechanism 80 is important to the functionality of the registration mechanism 100 to briefly stop the film and allow precision alignment within the image plane 66 during the recording process. An important feature of the motor is its ability to operate at selectable modes, allowing implementation of the film transport system in a telecine or scanner machine.

Figure 3:
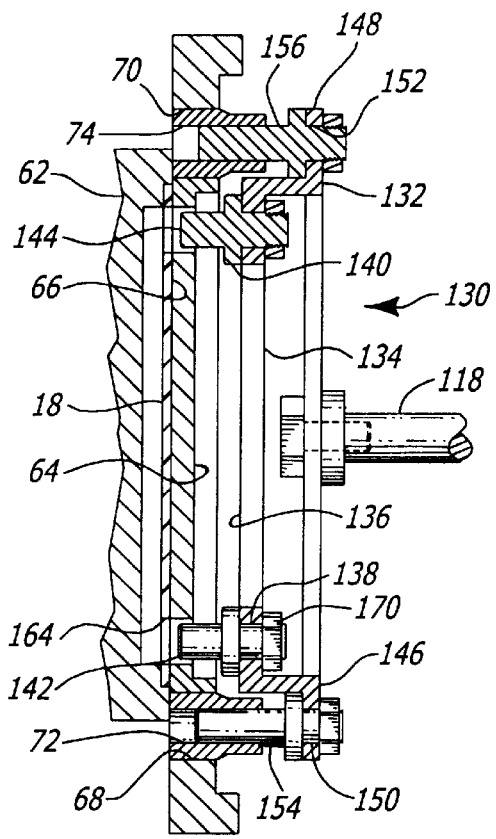
FIG. 3 is a vertical sectional view taken along line 3—3 of FIG. 2.

Referring now to FIGS. 2 and 3, the registration mechanism, generally designated 100, includes a second driver or actuator 102 and an alignment device 130 responsive to the actuator to immobilize and engage the film perforations and orient them to the image plane 66.

The actuator 102, according to one embodiment of the present invention, comprises a magnetostrictive device that achieves rapid, high-power linear motion in response to low-voltage electric current. The actuator includes a magnetostrictive metal alloy that expands quickly and forcefully to drive a pushrod 104 through a pre-set stroke when placed in a magnetic field aligned with the material's magnetostrictive axis. Units typically include a stainless steel housing and an internal spring system to provide prestress. The prestress functions to orient magnetic domains normal to the compression axis, thereby maximizing displacement of the pushrod. An internal solenoid coil wound around the pushrod creates magnetic field changes in response to input current signals from the controller 180. An actuator according to one particular embodiment of the invention is available from ETREMA PRODUCTS, INC. under the trade name ETREMA TERFENOL-D, Model No. AA-140J013-ES1.

Typically, the actuator is initially mechanically biased by an internal belleville washer (not shown) to position the pushrod 104 in a retracted orientation and optimized to provide an actuation force of approximately 200 pounds. The pushrod may also be biased magnetically with respect to the center of travel. The resulting stroke traveled by the pushrod during actuation measures approximately 0.005 inches. The stroke may be conveniently changed merely by changing the input voltage to the actuator. Typical actuation for processing film stocks of 0.078 inches in height occurs with response times approximating 0.001 seconds with an input voltage of 75 volts and input current of 25 amperes. However, by lowering the input voltage to approximately 37.5 volts, the stroke may be shortened to 0.0025 inches, appropriate for a film stock having a height of 0.073 inches. Because of the magnetic nature of the magnetostrictive device, such actuators have relatively long term operational lifetimes.

While magnetostrictive actuators are preferred for the film transport of the present invention, alternative actuation devices may perform the actuating function with varying results. For example, relatively slow applications may be realized by a current responsive solenoid. If high voltage generation and control is of no concern, voice coils and piezo-electric actuators may be implemented.

Further referring to FIG. 2, to amplify the effective stroke of the actuator pushrod 104, the registration mechanism 100 employs a linkage supported by respective first and second bases 112 and 114, and including a pivoting link 116 and a shaft 118. The first base 112 includes a raised platform mounted to the console 12 for elevating and pivotally mounting the link 116. The link comprises an elongated bar with a proximal end portion mounted to the actuator pushrod 104 in a perpendicular relationship. Above the proximal end, the link pivotally attaches to the base at 115 to effect a 22:1 lever arm configuration between the two ends of the link. The shaft 118 comprises a narrow rod and attaches to the distal end of the link in substantially parallel relationship to the actuator pushrod 104. The proximal end of the shaft serves as a bearing 120 to slidably engage a bearing guide 122 elevated to the height of the shaft by a riser (not shown) projecting upwardly from the second base 114.

Referring now to FIGS. 2 and 3, The alignment device 130 mounts to the distal end of the shaft 118 and comprises a narrow bracket 132 configured to laterally span the advancing film and immobilize the film in response to the amplified stroke from the actuator 102. The bracket is formed with an elongated hat shaped wall 134 and includes an engagement surface 136 formed with a pair of spaced apart openings 138 and 140 to mount respective registration pins 142 and 144. Disposed at the opposite ends of the wall are respective outwardly projecting bearing flanges 146 and 148 formed with respective throughbores 150 and 152 for receiving respective cylindrical guide elements 154 and 156. The guide elements are configured to slidably engage the bearings laterally positioned across the image plane 66 of the transparent stage 64.

Figure 5:
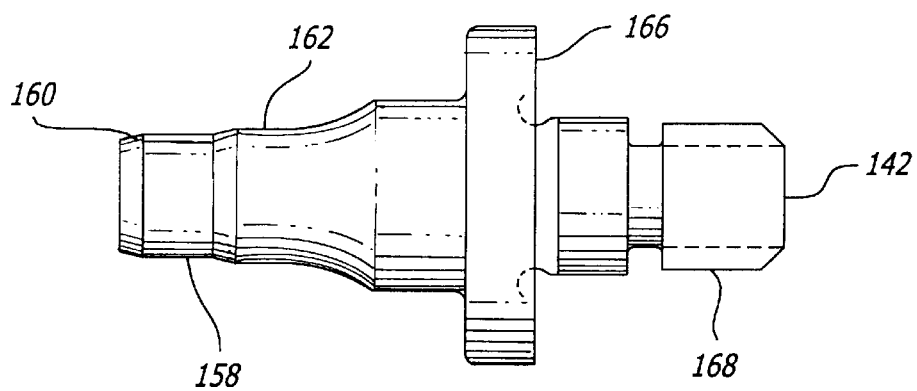
FIG. 5 is an enlarged elevational view of a registration pin according to the present invention shown in isolation.

FIG. 5 illustrates the detailed structure of the full fitting registration pin 142 that includes structure for allowing the pin to adapt to different film stocks, it being understood that the pin 146 may be similarly formed. Thus, each registration pin has a distal tapered tip 160 that widens radially and inwardly in a stepped manner to form a first uniformly radial portion 158, and a second radial portion 162. This dual full-fitting feature serves to align differently dimensioned film stocks, both longitudinally and laterally. By radially stepping the pin in this manner, the machine is automatically adaptable to different film stocks. For example, film stocks with perforation heights of 0.073 inches are guided by the first radial portion 158, while film stocks having slightly larger perforations of 0.078 inches are guided by the second radial portion 162. The convenient adaptability of the dual full-fitting pin relies on the stroke adjustability of the magnetostrictive actuator to drive the pin along a proper engagement depth. In one embodiment, the pin 146 is only full-fitting along the longitudinal axis to prevent the film from rotating around the full-fitting pin 142. The pin further includes a stop 166 and a threaded shank 168. The shank receives a nut 170 (FIG. 3) that cooperates with the stop to secure the pin to the bracket 132. Moreover, because the perforations used to register the frame in position comprise those used during exposure of the motion picture film, the full-fitting pin achieves registration accuracies approaching pixel-level dimensions.

Referring now to FIG. 6, the controller 180 includes an electronic circuit board operative according to preprogrammed commands and having respective outputs connected to the respective inputs of the take-up reel motor 40, the sprocket motor 88 and the registration mechanism actuator 102. The controller channels sufficient power from a power source to each of the electromechanical components as required. A manually controllable switch (not shown) mounts to the console for convenient on\off activation of the system and mode selection. Because of the relatively low level of power required by the actuator, the film transport of the present invention is operable using a standard 110 VAC source.

To effect the proper timing between the feeder 80 and the actuator 102, a sensor (not shown) typically comprising one or more photodiodes is connected to the drive mechanism sprocket 82 to detect the positioning of respective film frames advancing through the gate 60. The sensor output is connected to the controller 180 and provides feedback monitoring for the controller to command the actuator 102 at relatively precise timing intervals corresponding to the intermittent film advancement at pixel-level registration accuracies.

Typically, the electronics and electromechanical hardware may be purchased as a "projector head assembly" package available from WESTREX, INC., located in Simi Valley, Calif., 93065. Assembly of the film transport 30 of the present invention is relatively straightforward and well within the capabilities of those skilled in the art. Programming of the electronic controller 180 occurs during assembly and involves implementing commands to monitor the movement of the film as it advances through the gate by the action of the sprocket, and issue an actuation signal to the actuator 102 to drive the registration mechanism 100 into position when the film intermittently stops.

An important feature of the film transport 30 of the present invention is the capability of operating in three selectable modes: "cine-mode", "jog-mode" and "slew-mode". In a telecine machine incorporating the present invention, to effect image transfer, and optionally activate the registration mechanism 100, cine-mode is employed. Cine-mode is also used to view the film at normal playback speeds. Normally, pin registration will only be turned on for the final transfer to video after all the color correction information has been gathered. When the image transfer operation terminates, the machine may be switched to slew-mode, which rewinds the film at high speed, bypassing the intermittent registration mechanism. Jog-mode provides variable speed capability to rapidly examine particular frame sequences and scene boundaries for color correction purposes. Because of the selectable modes of operation realized by the driver mechanism, the film transport mechanism is suitable for use in telecine as well as scanner applications.

Figure 7:
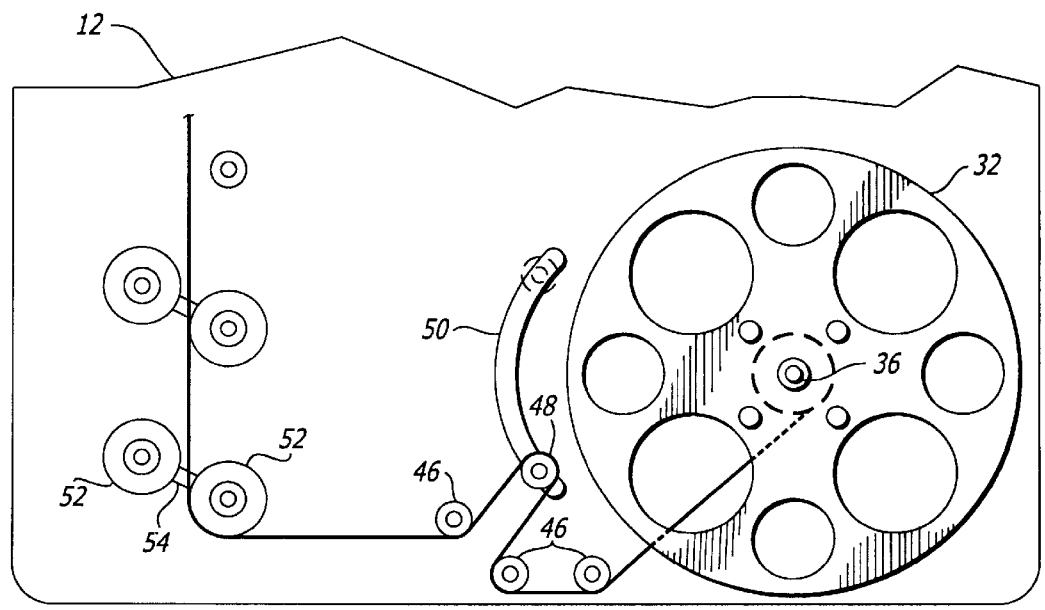
FIG. 7 is a partial frontal view of the supply reel with a portion of the tension and particle transfer rollers during rewinding.

Operation of the film transport 30 typically begins by loading the film supply spool 32 onto the supply reel spindle 36, and pivoting the PTR rollers 52 to an "open" position as shown in FIG. 7. This allows relatively straightforward threading of the film 18 through and across the rollers. The threading technique typically includes forming respective loops 184 and 186 to provide slack for the drive mechanism 80 as the film enters the gate 60. Once reel-to-reel threading of the film is complete, the controller may be activated to "cine-mode" by turning the manual switch accordingly.

Once activated, the take-up reel motor begins winding film around the reel 34 at a rate corresponding to the rate of advance through the gate 60. The drive mechanism motor 88 controls the rate of advance by sequentially turning the sprocket according to the timing wheel 96 to draw the film into the gate at a real-time rate typically within the range of 1–60 frames per second. The drive mechanism motor operates effectively independently from the actuator to allow parallel processing of the feeding and registering steps.

The controller 180 determines the overall accuracy of the sequential advancement of the film 18 through the gate 60 such that each respective frame lies substantially within the image plane 66 for a predetermined duration. The sensor 182 detects the advancing frames and issues a corresponding feedback signal to the controller 180. In response to the sensor signal, the controller sends an activation signal to the actuator 102.

The actuator 102 receives the activation signal and, within approximately 0.001 seconds, pushes the biased pushrod 104 outwardly along the 0.005 inch stroke. The pushing force acts on the pivoting link 116 to generate a pivoting action about the pivot point. This causes the opposite end of the link to swing forward through an arc. Because of the lever arm configuration of the link, the movement at the opposite end of the link is amplified approximately twenty-two times to effect an overall linear forward displacement of approximately 0.100 inches to the connected shaft 118.

Figure 4:
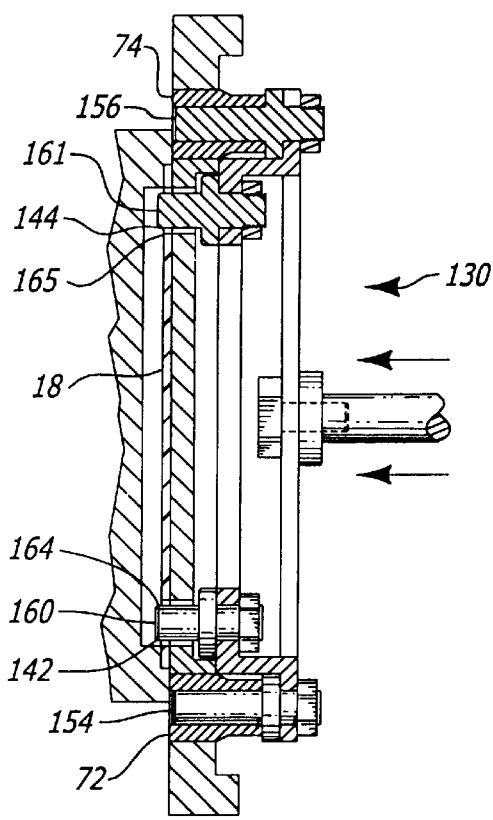
FIG. 4 is an elevated transverse sectional view similar to FIG. 3.

The shaft 118 responds to the amplified actuator stroke by driving the registration mechanism 100 forward approximately 0.100 inches along the cylindrical bearings 154 and 156 to thrust the pins 142 and 144 into engagement with the film perforations 164 and 165 as shown in FIG. 4. As the pins 142 and 144 initially engage the frame perforations, the respective distal tips 160 penetrate respective perforations to begin eliminating any positional imperfections with the frame. In accordance with the multi-stock compatibility of the registration mechanism, the respective pin tips continue penetrating the perforations until, for the heights of 0.073 inches, the perforations seat on the respective first radial portions 158, or for heights of 0.078 inches, the perforations seat on the respective second radial portions 162. The pins hold the frame stationary for a predetermined duration sufficient to allow the camera 24 to record the frame image.

At the instant the pins immobilize the frame in position, the controller issues a command signal to the camera to record the projected image. This occurs through either a digital scanning process to detect image changes according to the MPEG-2 format, or an analog video exposure process to record the image in a traditional videotape format.

Once the camera completes recording the image, and the stationary duration expires, the controller 180 issues a deactivation command to the actuator 102 to retract the pushrod 104 back to its initial state, and thereupon force the linkage to retract the bracket 132 from the film. Once the bracket clears the film path, the feeder draws the next frame substantially within the field of view for the registration process to repeat. Because of the relative mechanical independence of the actuator from the drive mechanism motor, allowing efficient parallel processing during the feeding and registering steps, real-time transfer rates of up to 60 frames per second are achievable.

Upon completion of the image transfer for a particular reel, high speed rewinding of the film back onto the supply spool 32 may be accomplished by switching the film transport 30 to slew-mode. Slew-mode also provides a convenient fast-forward capability for efficiently carrying out selected takes. For many videotape applications, the film generally advances through the system several times to provide color correction. By utilizing the slew-mode in conjunction with the cine-mode, repetitive corrections for videotape color processing may be effected in an efficient manner.

Those skilled in the art will appreciate the many advantages afforded by the film transport of the present invention. The registration mechanism included within the gate allows flexibility in producing a variety of reproductions in a variety of image formats.

For example, the registration mechanism precisely aligns each respective frame to the camera field of view with a registration accuracy approaching the pixel level, such that successive projected images remain within a stationary boundary. This is made possible by the compact nature of the film transport, which provides the ability to register each frame with its associated perforations to the field of view. Since the frame was exposed by a motion picture camera using the same perforations, the registration accuracy is dramatically improved. Precise registration is critical in digital recording followed by the MPEG-2 compression algorithm, which digitally processes only image changes from the original recording to minimize recording time. This feature is also important in most videotape recordings due to the back and forth color corrections that are typically carried out on particular sequences of film. The dramatic reduction in time and memory required to effect an image recording allows more timely and efficient widespread distribution of the motion picture to the home viewing public.

Also advantageous is the uncoupled nature of the drive mechanism motor and the registration mechanism actuator. This enables performance of the drawing and registering operations in parallel to maximize the speed of the film registration, and enable pixel-level registration.

Those skilled in the art will additionally appreciate the performance of the magnetostrictive actuator. The actuator combines high response with relatively low voltage requirements, and minimizes repair costs through its near indefinite operational life span. Assembly and repair will also be minimized by the relatively few parts required to implement the magnetic device.

While the invention has been particularly shown and described with reference to the preferred embodiments thereof, it will be understood by those skilled in the art that various changes in form and detail may be made therein without departing from the spirit and scope of the invention.

What is claimed is:

1. A film transport for use with an image transfer system to sequentially position respective frames of motion picture film into a predetermined registered frame position relative to a field of view of an image recorder, said film having proximate its respective longitudinal edges a plurality of spaced apart perforations aligned in a predetermined relationship with said frames, said film transport including:
   a film supply mechanism for supplying film containing a series of image frames to be transferred;
   a film take-up mechanism;
   a film guideway defining a predetermined film path from said supply mechanism to said take-up mechanism;
   a controller capable of detecting the relative position of said image frames; and
   a gate disposed along said path and including
      a drive mechanism having a motor selectively controllable between intermittent and continuous modes of operation for advancing said film along said path, and
      a registration mechanism actuated by a driver controllable independently of said motor, said driver coupled to an aligner to immobilize said film and sequentially orient said perforations such that said frames are sequentially disposed in said predetermined registered frame position.

2. A film transport according to claim 1 wherein:
said guideway includes a plurality of spaced apart rollers for controllably suspending and placing said film in tension.

3. A film transport according to claim 1 wherein:
said drive mechanism comprises a sprocket mounted to said motor and having a plurality of spaced apart sprocket teeth engageable with said perforations as said motor shaft turns said sprocket at a rate corresponding to one of said selected modes.

4. A film transport according to claim 3 wherein:
said motor comprises a cup armature motor and said modes include cine-mode, slew-mode and jog-mode.

5. A film transport according to claim 1 wherein said drive mechanism further includes:
   a detector for determining the relative positions of said perforations for intermittently stopping said sprocket for a predetermined duration as a frame moves into said field of view.

6. A film transport according to claim 1 wherein:
said aligner comprises a bracket having a plurality of engagement pins aligned with said field of view and coupled to an actuator, said actuator controllable independently of said motor and synchronously responsive to said controller to drive said bracket pins into immobile engagement with said film perforations and orient a frame into said predetermined registration with said field of view when said drive mechanism draws said frame substantially within said field of view.

7. A film transport according to claim 6 wherein said actuator couples to said bracket through a linkage, said linkage including:
   a base;
   an elongated arm having a proximal end coupled to said actuator and a distal end, said arm pivotally mounted to said distal end such that said arm amplifies the angular displacement from a predetermined stroke acting on said arm from said actuating mechanism to said distal end; and a shaft having a first end mounted transversely to said arm distal end and a second end attached to said bracket, said shaft responsive to the amplified angular displacement of said arm distal end to drive said bracket into immovable engagement with said film.

8. A film transport according to claim 6 wherein:

said actuator is of the type responsive to electromagnetic fields.

9. A film transport according to claim 8 wherein:

said actuator comprises a magnetostrictive actuator.

10. A film transport according to claim 6 wherein:

said actuator is of the type responsive to electric current signals.

11. A film transport according to claim 10 wherein:

said actuator comprises a voice coil.

12. A film transport according to claim 6 wherein:

at least one of said pins is formed with a base corresponding to the size of a film sprocket hole, and a tapered tip, whereby at least one of said pins initially captures and engages said hole with said tip to orient said frame in an intermediate position and continue to penetrate said hole and incrementally adjust said frame until stopped by said base at said predetermined registered position.

13. A high speed image transfer system for reproducing illuminated images from motion picture film onto a secondary image format, said film having proximate its respective longitudinal edges a plurality of spaced apart perforations aligned in a precise relationship with respective film frames, said system including:

a light source;

an image recorder disposed proximate said light source and having a predetermined field of view;

a film supply mechanism for supplying film containing a series of image frames to be transferred;

a film take-up mechanism;

a film guideway defining a predetermined film path from said supply mechanism to said take-up mechanism;

a controller capable of detecting the relative position of said image frames; and a gate disposed along said path and interposed between said light source and said recorder, said gate including a drive mechanism having a motor selectively controllable between intermittent and continuous modes of operation for advancing said film along said path, and a registration mechanism comprising a bracket having a plurality of engagement pins aligned with said field of view and coupled to an actuator, said actuator controllable independently of said motor and synchronously responsive to said controller to drive said bracket pins into immobile engagement with said film and orient a frame into a predetermined registration with said field of view when said drive mechanism draws said frame substantially within said field of view.

14. An image transfer system according to claim 13 wherein:

said image recorder comprises a digital scanner to read said images and create digital data corresponding to said images.

15. An image transfer system according to claim 13 wherein:

said image recorder comprises a videotape recorder for creating a videotape reproduction of said motion picture film.

16. A method of sequentially aligning respective frames of a motion picture film into a predetermined registered position with respect to an image recorder field of view and within the gate of a film transport, said film formed proximate its respective longitudinal edges with spaced apart perforations, said method including the steps of:

advancing said frames sequentially into said gate by a drive mechanism driven by a motor and into an initial position substantially within said field of view, said drive mechanism being selectively controllable between intermittent and continuous modes of frame advancement;

sensing said initial frame position;

actuating a registration mechanism including a driver independent of said motor; and immobilizing said frames with said registration mechanism to orient said frame into said predetermined registered position.

17. A method according to claim 16 wherein said actuating step further includes the step of:

applying an electromagnetic field to said independent driver; and driving said registration mechanism with said independent driver in response to said electromagnetic field.

18. A method according to claim 16 wherein said actuating step includes the steps of:

capturing said perforations with the tapered pins of said registration mechanism to orient said frame in an intermediate position; and driving said pins through said perforations in a full-fitting relationship to adjust said frame into said predetermined registered position.

19. A method according to claim 16 wherein said actuating step includes actuating said registration mechanism with a magnetostrictive actuator.

20. A method according to claim 16 wherein said drawing step includes:

selecting a mode of operation for said motor to define an operating speed; and guiding said frames into said gate according to said selected mode.

21. A method according to claim 20 wherein said selecting step includes:

selecting at least one mode from the group including cine-mode, slew-mode and jog-mode.

* * * * *